US011962659B1

(12) United States Patent
Francis et al.

(10) Patent No.: US 11,962,659 B1
(45) Date of Patent: Apr. 16, 2024

(54) ADAPTIVE DISCOVERY PROCESS SCHEDULING

(71) Applicant: ServiceNow, Inc., Santa Clara, CA (US)

(72) Inventors: Steven W. Francis, San Diego, CA (US); Sai Saketh Nandagiri, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/222,664

(22) Filed: Jul. 17, 2023

(51) Int. Cl.
*H04L 67/51* (2022.01)
*H04L 67/62* (2022.01)

(52) U.S. Cl.
CPC .............. *H04L 67/51* (2022.05); *H04L 67/62* (2022.05)

(58) Field of Classification Search
CPC ................................ H04L 67/51; H04L 67/62
USPC ........................................................ 709/201
See application file for complete search history.

(56) References Cited

U.S. PATENT DOCUMENTS

| 10,079,730 | B2 * | 9/2018 | Subramanian | ...... H04L 41/0806 |
| 10,243,919 | B1 * | 3/2019 | Suresh | ................ H04L 67/1001 |
| 10,547,521 | B1 * | 1/2020 | Roy | ..................... H04L 41/0895 |
| 10,708,795 | B2 * | 7/2020 | Tapia | ..................... H04W 24/04 |
| 2019/0340026 | A1 * | 11/2019 | Manda | .................. G06F 9/4887 |
| 2023/0168925 | A1 * | 6/2023 | Makaya | .............. G06F 9/30036 |
| | | | | 718/102 |

* cited by examiner

*Primary Examiner* — Wing F Chan
*Assistant Examiner* — Leon Y Tseng
(74) *Attorney, Agent, or Firm* — Van Pelt, Yi & James LLP

(57) ABSTRACT

Metrics that characterize one or more computing devices are received. A time value associated with a performance of the one or more computing devices based on the received metrics is determined. A first scheduling parameter based on the time value is determined, wherein the first scheduling parameter is associated with a first discovery process that is associated with at least a portion of the one or more computing devices. Execution of the first discovery process is executed according to the first scheduling parameter.

20 Claims, 7 Drawing Sheets

US 11,962,659 B1

ADAPTIVE DISCOVERY PROCESS SCHEDULING

BACKGROUND OF THE INVENTION

During a discovery process, information technology operations management (ITOM) teams discover information regarding a network environment. For example, resource discovery may include discovering configuration items registered to a network environment, their relationships and dependencies, and their operating health. The discovered configuration items and their latest statuses can be stored in a configuration item database. To produce useful and accurate results, the discovery process results should reflect the current state of the information technology environment.

BRIEF DESCRIPTION OF THE DRAWINGS

Various embodiments of the invention are disclosed in the following detailed description and the accompanying drawings.

DETAILED DESCRIPTION

Figure 1:
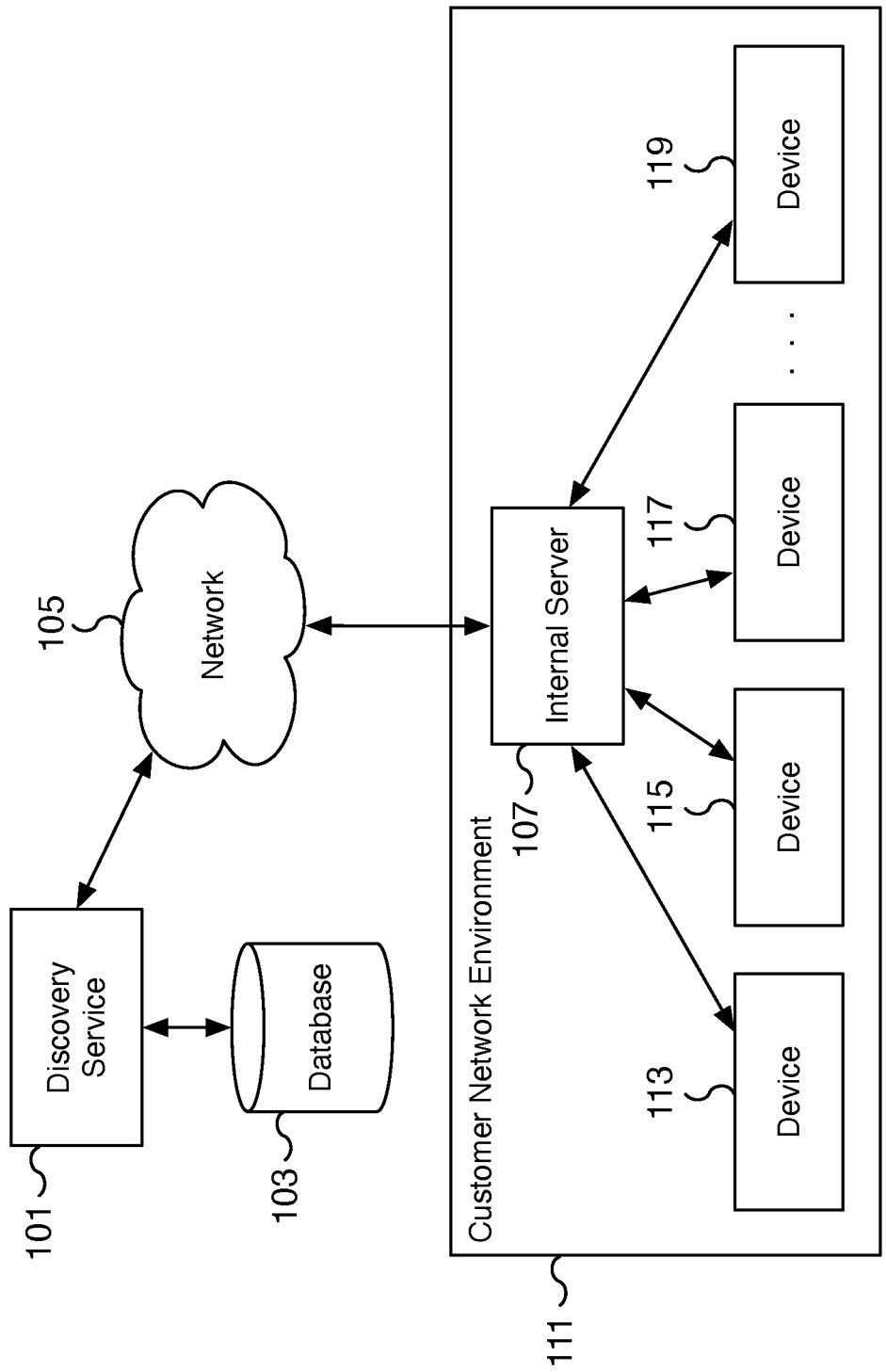
FIG. 1 is a block diagram illustrating an example of a network environment for performing information technology discovery.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Adaptive discovery process scheduling is disclosed. For example, using the disclosed techniques, a discovery process can be throttled based on the factors such as current resource usage and discovery resource requirements. In various embodiments, discover processes are adaptively scheduled in order to reduce the performance and cost impact of their execution. For example, a discovery process can be adaptively delayed until the impacted computer devices, such as one or more discovery databases, have additional processing bandwidth. Similarly, in the event the required bandwidth or similar resources are available, a discovery process can be evaluated to be executed immediately. In various embodiments, the network infrastructure and its devices including the computer devices associated with the discovery process are monitored to collect metrics. The metrics can be collected in real time and/or via background processes that are run at configured intervals. Using the collected metrics, the impact of running a discovery process immediately without a delay is analyzed. For example, the collected metrics are converted to a universal time value that corresponds to the performance associated with the network infrastructure and in particular the discovery process. In the event the analysis determines that executing the process immediately would result in an undesirable performance degradation, one or more scheduling parameters are determined for delaying the execution of the discovery process. For example, a scheduling delay parameter is determined based on at least the collected metrics to identify an optimal (or more optimal) time to execute the discovery process. In some embodiments, the scheduling delay parameter is determined using multiple factors including proportional, integral, and derivative factors associated with the collected metrics. The determined scheduling delay is adaptive allowing different discovery processes to be scheduled for different determined delays depending on context. In some embodiments, the scheduling delay parameter can include an increasing decay that ensures a discovery process will be executed and will not be infinitely scheduled.

In some embodiments, metrics that characterize one or more computing devices are received. For example, metrics associated with the performance and/or resource utilization of computing devices used for and/or associated with discovery are collected and received. The metrics can include metrics collected in real-time as well as metrics collected using a reoccurring process, such as a background process configured to run at pre-defined intervals. In some embodiments, a time value associated with a performance of the one or more computing devices is determined based on the received metrics. For example, the received metrics may be received in units other than time, such as in number of processes running, memory utilized, number of active database connections, database replication lag, etc. The received metrics are converted using one or more conversion factors and/or weights into a performance time value. For example, the determined performance time value can correspond to a predicted time delay in performing a discovery task such as running a specific discovery process.

In some embodiments, a first scheduling parameter based on the time value is determined, wherein the first scheduling parameter is associated with a first discovery process that is associated with at least a portion of the one or more computing devices. For example, the first scheduling parameter can be a time delay for scheduling the first discovery process. The time delay can indicate how long to wait until the first discovery process is scheduled and/or executed. For example, the first discovery process can be delayed until the computing device resources required for the first discovery process are available and/or until the first discovery process will have a reduced impact on resource usage. In some embodiments, the execution of the first discovery process is directed according to the first scheduling parameter. For example, the first discovery process is scheduled to be executed after the determined scheduling delay. In various embodiments, the first scheduling parameter or the determined scheduling delay is determined based on at least a proportional factor, an integral factor, and a derivative factor. For example, depending on the context surrounding the requested first discovery process, proportional, integral, and derivative factors are calculated and used to determine the first scheduling parameter. In some embodiments, the first scheduling parameter further includes an increasing decay factor such that the first discovery process cannot be infinitely rescheduled. For example, on each subsequent rescheduling of the first discovery process, the scheduled delay is less than the previously scheduled delay. In the event the first discovery process is repeatedly rescheduled, eventually, the scheduled delay will allow the process to be executed immediately.

In some embodiments, discovery processes such as the first discovery process is configured to identify one or more configuration items of the configuration management database. For example, the discovery processes can be used to identify and/or monitor configuration items such as hardware and/or software assets. The identified configuration items are stored in a configuration management database. By throttling the execution of discovery processes, such as by rescheduling specific discovery processes, the overall usage from executing discovery processes can be reduced to efficiently utilize current system sources.

FIG. 1 is a block diagram illustrating an example of a network environment for performing information technology discovery. In the example shown, discovery service 101 and customer network environment 111 are connected via network 105. Network 105 can be a public or private network. In some embodiments, network 105 is a public network such as the Internet. In various embodiments, discovery service 101 is a cloud-based application service that provides discovery services targeting one or more network environments such as customer network environment 111. Discovery service 101 utilizes database 103, which is communicatively connected to discovery service 101. Discovery service 101 together with internal server 107, which is located within customer network environment 111, are part of a discovery platform for discovering assets and their attribute values that are located within customer network environment 111. For example, using discovery service 101, an administrator, such as a member of an information technology operations management (ITOM) team, can activate discovery scans to collect attribute values associated with the different configuration items of customer network environment 111. The saved attribute values and discovered configuration items can be saved in database 103. In various embodiments, database 103 is a configuration management database (CMDB) and the discovered configuration items are managed as part of a cloud service such as a CMDB service (not shown) associated with discovery service 101. In the example shown, example devices of customer network environment 111 include devices 113, 115, 117, and 119.

In some embodiments, discovery service 101 provides cloud-based discovery for managing an information technology environment. The discovery results can be stored in a configuration management database (CMDB) and utilized with CMDB services. For example, configuration items associated with entities (or devices) within a customer's network infrastructure, such as devices 113, 115, 117, and 119, can be discovered, tracked, and managed using discovery and CMDB services. In various embodiments, discovery service 101 relies on internal server 107 to complete the discovery process, including probing devices within customer network environment 111 for device specific attribute values. For example, a discovery scan is scheduled via discovery service 101. The scheduled scan includes one or more configured probes that specify the attributes to collect. Example attributes can include a manufacturer, an operating system type, an operating system version, an uptime value, a processor speed, a memory description, and installed applications, among other attributes of the target entity. Once the discovery scan is initiated, the probes are provided to internal server 107, which manages the collection of the attribute values for the targeted devices and/or entities. The collected attribute values can be aggregated at internal server 107 and then collected and stored by discovery service 101 at database 103. In various embodiments, the adaptive management of the discovery processes by discovery service 101 allows discovery to be performed without creating a significant negative impact on the performance on discovery service 101, database 103, and/or customer network environment 111.

In some embodiments, customer network environment 111 is an information technology network environment and includes multiple hardware devices including devices 113, 115, 117, and 119, as examples. Devices 113, 115, 117, and 119 correspond to hardware devices and each can be one of a variety of different hardware device types including networking equipment (such as gateways and firewalls), servers, and other computing devices including employee laptops and desktops. Devices 113, 115, 117, and 119 are each configured with different hardware and software components and their properties can be expressed as attributes. Example attributes include processor type, processor count, memory size, memory type, operating system type, and operating system version, among others. In various embodiments, customer network environment 111 is connected to network 105. In the example shown, internal server 107, under the direction of discovery service 101, is capable of initiating network connections to each of devices 113, 115, 117, and 119 and retrieving attribute values associated with each of the respective devices. Configuration items associated with hardware and/or software assets of customer network environment 111 including devices 113, 115, 117, and 119 can be discovered by discovery service 101.

In the example shown, internal server 107 is an intranet server of customer network environment 111. Internal server 107 can be configured to receive and perform discovery scan requests from discovery service 101. The results of the discovery scan are sent back to discovery service 101 where they can be stored in database 103. In various embodiments, a discovery scan includes one or more probe requests, which specify the attributes to collect from one or more devices. Once collected, the attribute values are uploaded to discovery service 101 to update database 103. In various embodiments, internal server 107 is utilized to perform the discovery scan because it resides within customer network environment 111 and has increased access privileges that devices outside of customer network environment 111 do not have. For example, the probe requests on devices within customer network environment 111 cannot be performed directly by a device located outside of customer network environment 111.

In some embodiments, database 103 is utilized by discovery service 101 and other services for providing application services including discovery and CMDB services. For example, database 103 can be a configuration management database (CMDB) used at least in part for managing assets that are under the management of an organization, such as devices 113, 115, 117, and/or 119 of customer network environment 111. Each managed asset can be represented as a configuration item. In some embodiments, database 103 stores information related to managed assets, such as the hardware and/or software configuration of a computing device, as configuration items. In some embodiments, database 103 is implemented using one or more databases such as one or more distributed database servers. For example, although shown as a single entity in FIG. 1, database 103 can be implemented as one or more distributed database components connected via network 105 to discovery service 101. In particular scenarios, the discovery process can create significant resource strains on discovery resources including and particularly on database 103. Based on the operating context, discovery processes are adaptively scheduled to manage resource usage using the disclosed techniques.

Although single instances of some components have been shown to simplify the diagram of FIG. 1, additional instances of any of the components shown in FIG. 1 may exist. For example, discovery service 101 and database 103 may include one or more servers and/or may share servers. In some embodiments, database 103 may not be directly connected to discovery service 101. For example, database 103 and its components may be replicated and/or distributed across multiple servers and/or components. In some embodiments, components not shown in FIG. 1 may also exist. For example, network clients used to access discovery service 101 are not shown.

Figure 2:
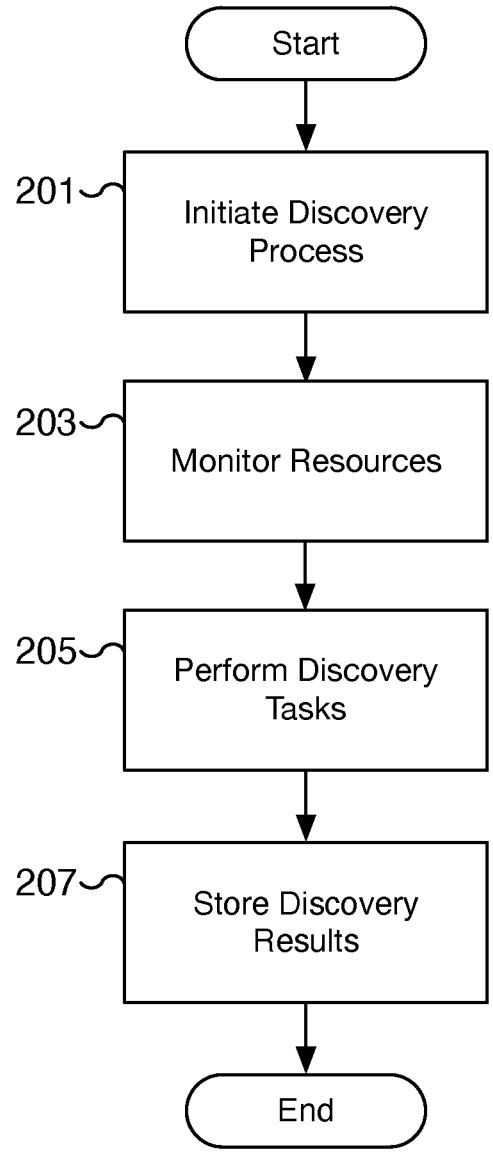
FIG. 2 is a flow chart illustrating an embodiment of a process for performing discovery within a customer network.

FIG. 2 is a flow chart illustrating an embodiment of a process for performing discovery within a customer network. For example, using the process of FIG. 2, a discovery process of configuration items located within a customer network infrastructure can be initiated and performed using a discovery service. In various embodiments, the discovery process is configured using a discovery service and when a discovery scan is performed, probe requests are initiated from an internal server located within the customer's network infrastructure. The internal server collects the requested attribute values for the requested customer devices and the discovery data is provided to the discovery service where it is stored in a discovery service database. The customer can then access the discovery scan results via the discovery service, a CMDB service, and/or another application service. To improve the efficiency of the discovery process, discovery processes can be adaptively scheduled based on expected performance and resource utilization. For example, resource usage and related metrics are monitored and analyzed to determine the appropriate time to schedule discovery tasks for execution. In some embodiments, the process of FIG. 2 is performed by a discovery service such as discovery service 101 of FIG. 1, the discovery results are stored using a database such as database 103 of FIG. 1, and/or the customer's information technology environment is customer network environment 111 of FIG. 1.

At 201, a discovery process is initiated. For example, discovery is configured and initiated for a customer information technology environment. In some embodiments, discovery is initiated via a remote network client by accessing a dashboard of a discovery service. For example, an administrative client is used to access a discovery service to initiate discovery for configuration items of the customer environment. In various embodiments, as part of the configuration process, thresholds and other scheduling parameters can be configured. For example, scheduling parameters can be configured to adaptively throttle discovery tasks based on context. In some embodiments, scheduling factors including conversion factors and weights are configured to evaluate the performance of computational resources associated with the discovery process. For example, conversion factors can be customized to convert metrics such as memory usage, available database connections, replication lag, etc. into a time-based performance value. As another example, weight factors can be customized to weigh different metrics based on priority and/or other factors. In some embodiments, weights can be configured to apply configurable weights to proportional, integral, and differential factors for determining a scheduling delay.

At 203, resources are monitored. For example, resources associated with discovery are monitored. The resources can include the application servers used to perform the discovery process, the database servers for storing discovery results, and/or other computing devices associated with the discovery process such as the devices of the targeted customer information technology environment. In some embodiments, the metrics are collected via different techniques such as in real time and/or via background monitoring processes such as background processes that are run at configured intervals or times. In some embodiments, agents are used to collect the monitoring metrics. Example metrics can include a measure of the memory usage of certain processes, the number of current running processes, the number of current running discovery tasks, measurements related to properties of transaction logs including log aggregation values, server load percentage including a database load measure or measurement, available storage, available database connections, the number of active database connections, a replication lag value, and/or the time of day, among other metrics.

At 205, discovery tasks are performed. For example, discovery tasks including discovery scans are directed for execution by the discovery service. In some embodiments, the tasks and/or scans are implemented by executing discovery processes including network and/or remote processes. The performed discovery tasks can include scanning one or more configuration items for their properties such as values associated with their operating health and performance. In various embodiments, the results from performing the discovery tasks are returned to the discovery service. In some embodiments, the discovery tasks are scheduled based on context such as historical, current, and/or expected resource usage. The tasks can be adaptively scheduled, for example, to execute immediately or after a determined scheduled delay based on the metrics monitoring performed at 203.

At 207, discovery results are stored. For example, the results from performing discovery tasks are stored in a database such as a discovery database or configuration management database (CMDB). The stored discovery results can correspond to values of attributes determined for configuration items of the targeted customer information technology environment. In some embodiments, the values for configuration items are updated to reflect their current values and access to the values and corresponding discovery results are provided via the discovery service and/or a CMDB service.

Figure 3:
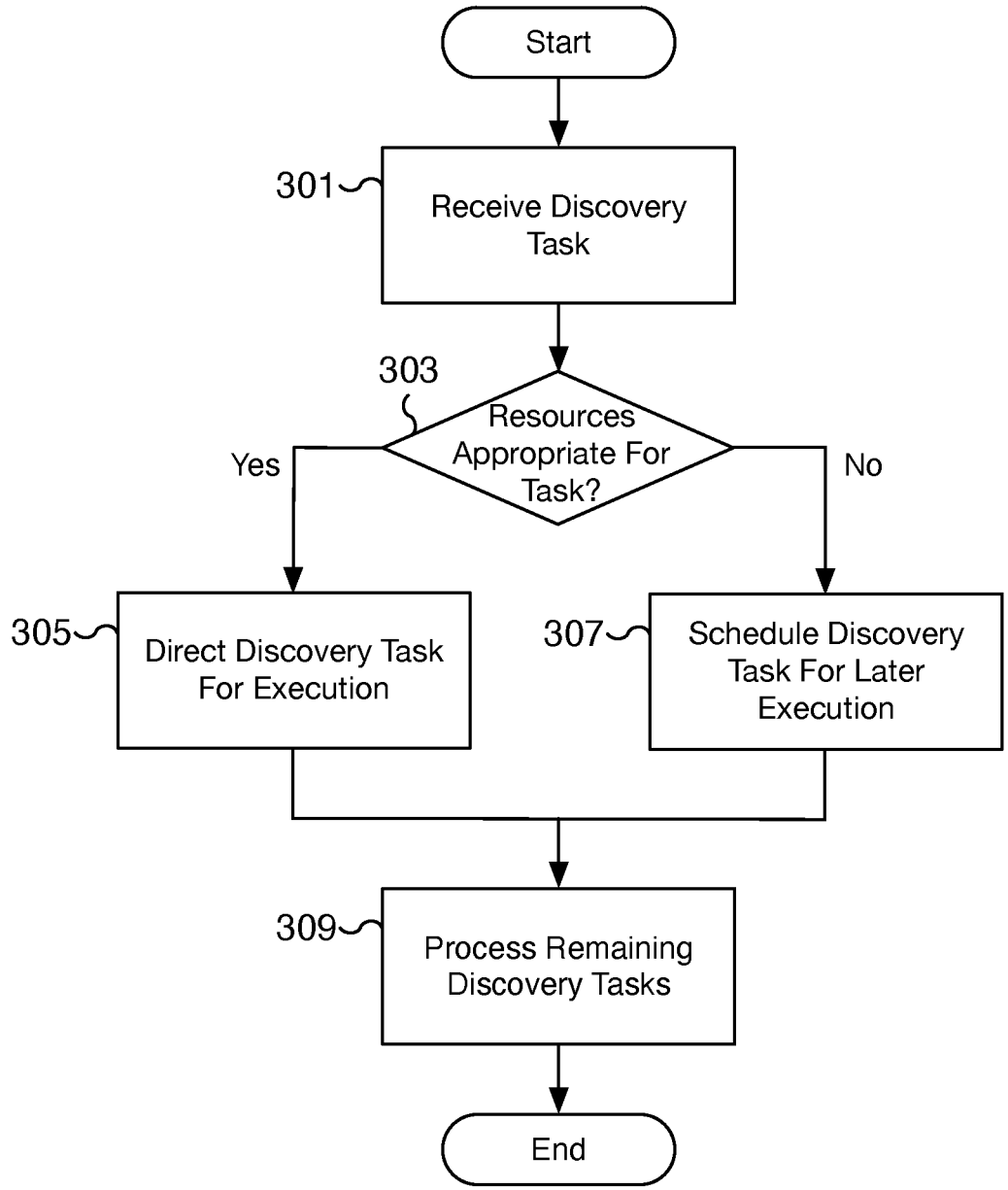
FIG. 3 is a flow chart illustrating an embodiment of a process for performing a discovery task.

FIG. 3 is a flow chart illustrating an embodiment of a process for performing a discovery task. For example, using the process of FIG. 3, a discovery task can be evaluated and directed for execution. In some embodiments, the discovery task is implemented as a discovery process that is executed using one or more computing devices. Based on resource context, the discovery task can be executed immediately or scheduled for execution at a later time. In some embodiments, the process of FIG. 3 is performed at 205 of FIG. 2. In some embodiments, the process of FIG. 3 is performed by a discovery service such as discovery service 101 of FIG. 1 based on the context of resources associated with the discovery process such as computing devices associated with discovery service 101 of FIG. 1, database 103 of FIG. 1, and one or more computing devices of customer network environment 111 of FIG. 1.

At 301, a discovery task is received. For example, a discovery task such as a discovery scan for particular configuration items is received. The task can be received based on an event timer being triggered (or expiring). In some embodiments, the received discovery task is configured to execute one or more discovery processes to gather discovery results that are to be saved in the discovery database. In various embodiments, the discovery task can be executed immediately or delayed and scheduled for execution at a later time. The determination to delay the task depends on the context of the received discovery task, such as current resource usage and the additional expected resource usage from executing the discovery task. In various embodiments, an analysis is performed to determine the current resources available for executing the discovery task. For example, metrics are received and used to analyze current resource usage and the expected resource usage from executing the task.

At 303, a determination is made whether the current resources are appropriate for executing the discovery task. In the event the current resources are appropriate for executing the discovery task, processing proceeds to 305 where the discovery task is directed for immediate execution. In the event the current resources are not appropriate for executing the discovery task, processing proceeds to 307 where the discovery task is scheduled for execution at a later time.

At 305, the discovery task is directed for execution. For example, the discovery task is immediately executed without a scheduling delay. In various embodiments, the discovery task is only executed in the event the current state of the computing devices involved in discovery can support performing the discovery task.

At 307, the discovery task is scheduled for later execution. For example, at 303, a determination is made that executing the discovery task immediately would result in a negative impact on the discovery process, such as a negative impact to the computing resources involved in discovery and/or the network infrastructure and its devices. Instead, the discovery task is scheduled to be executed at a later time and a scheduled time delay is determined based on the discovery context, such as the resources required for executing the discovery task and/or the current state of the system, among other factors. In various embodiments, the adaptive scheduling of the discovery task for execution at a later time allows the discovery task to be executed at a more appropriate time. For example, the task can be scheduled to be executed during a time window when the task will have minimal impact to the computing devices utilized and/or impacted by discovery.

At 309, the remaining discovery tasks are processed. For example, any pending discovery tasks that are received including tasks that were previously scheduled are processed. In some embodiments, the processing follows the same process as FIG. 3. For example, each pending task is received and an analysis is performed to determine when the task should be executed. In some embodiments, the pending tasks include tasks that were previously delayed from being executed based on context such as the state of available resources and the expected resource utilization from executing the discovery task.

Figure 4:
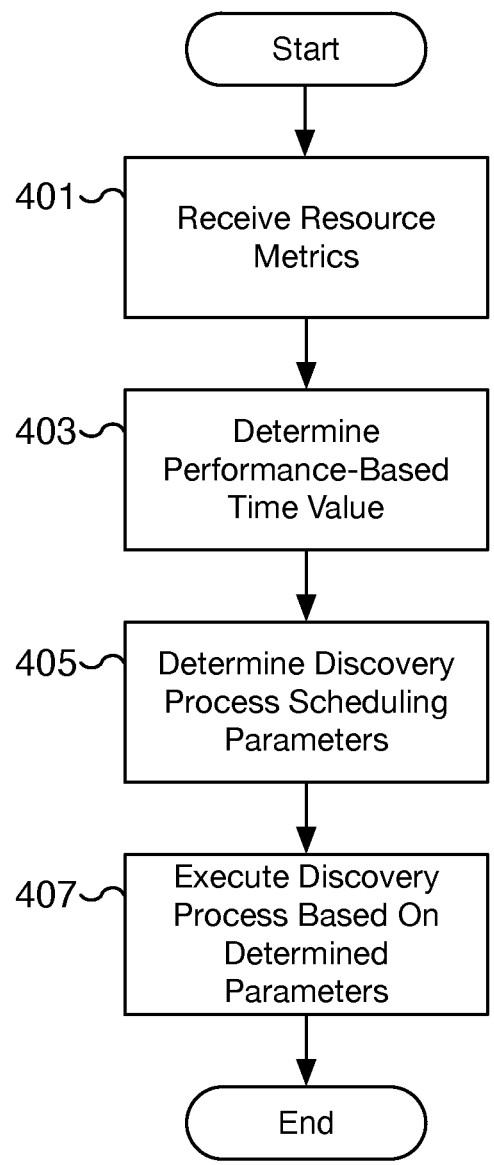
FIG. 4 is a flow chart illustrating an embodiment of a process for adaptively scheduling a discovery task.

FIG. 4 is a flow chart illustrating an embodiment of a process for adaptively scheduling a discovery task. For example, using the process of FIG. 4, a discovery task can be evaluated and directed for execution based on determined scheduling parameters. In some embodiments, the discovery task is implemented as a discovery process that is executed using one or more computing devices. Based on resource context, the discovery task can be executed immediately or scheduled for execution at a later time. In some embodiments, the process of FIG. 4 is performed at 205 of FIG. 2 and/or at 303, 305, and/or 307 of FIG. 3. In some embodiments, the process of FIG. 4 is performed by a discovery service such as discovery service 101 of FIG. 1 using resource metrics associated with the discovery process such as resource metrics gathered from computing devices associated with discovery service 101 of FIG. 1, database 103 of FIG. 1, and one or more computing devices of customer network environment 111 of FIG. 1.

At 401, resource metrics are received. For example, resource metrics related to discovery services are received. The metrics can include metrics gathered from the computing devices associated with performing discovery as well as the infrastructure used to perform discovery tasks. In various embodiments, the metrics received are in different and/or non-standardized units such as memory size available, memory utilized, memory usage of certain processes, number of current running discovery processes, number of current running processes, properties of transaction logs, server load percentage including database load percentage, available storage, available database connections, number of active or concurrent database connections, replication lag, and/or the time of day, among other units for metrics. The received metrics can be determined in real time or near real time, by background processes running at configured times, such as at set intervals, and/or by other appropriate techniques. In some embodiments, one or more of the metrics are queried as part of scheduling a discovery task. For example, metrics can be queried by probing a specific computing device or by retrieving a previously queried metric collected by a background process.

At 403, a performance-based time value is determined. For example, a time value is determined using the metrics received at 401. The determined time value is associated with the performance of the computing devices from which the metrics are collected. For example, the determined performance-based time value reflects the performance of discovery resources such as, at least in part, the performance of the discovery service and/or discovery database. In various embodiments, the performance-based time value is determined by applying one or more conversion factors to the metrics received at 401 to convert each received metric from its unit of measure into a performance-based time value unit of measure. An example of a performance-based time value is the expected number of milliseconds a pending discovery task will take to complete. In some embodiments, the performance-based time value is associated with a performance and/or delay error value. For example, the performance-based time value can be compared to the current error value to determine the impact of executing a discovery task.

In some embodiments, the different metrics are evaluated with different weights, for example, to prioritize some types of metrics over others. For example, a database load metric can be prioritized and weighted more heavily in determining the performance-based time value than a database storage usage metric. In various embodiments, the different weights and how they are applied to each metric can be configured, for example, by an administrator. Although the performance-based metric utilized at 403 is described in terms of a time value, another appropriate unit of measure can be utilized as well.

At 405, discovery process scheduling parameters are determined. For example, based on the performance-based time value determined at 405, past determined values, and configured threshold values, among other factors, discovery process scheduling parameters can be determined. In some embodiments, the parameters can include whether to schedule (or execute) the discovery process immediately or to wait a scheduled delay until executing the discovery process. In various embodiments, the scheduling parameters can be determined using proportional, integral, and derivative factors such that the scheduled time is adapted to the context of the discovery resources. In some embodiments, the scheduled time is determined using an increasing decay factor that prevents a discovery task from being repeatedly rescheduled with no opportunity to be executed.

At 407, the discovery process is executed based on the determined parameters. For example, using the discovery process scheduling parameters determined at 405, the discovery process is directed for execution. In some scenarios, the discovery process is executed immediately without delay. However, in particular scenarios, the discovery process is scheduled to be executed at a later time using a scheduling delay parameter determined at 405. For example, a discovery task can be scheduled to be performed once the impact of performing the task is reduced, such as when resources are no longer in contention and/or the discovery resource usage is reduced.

Figure 5:
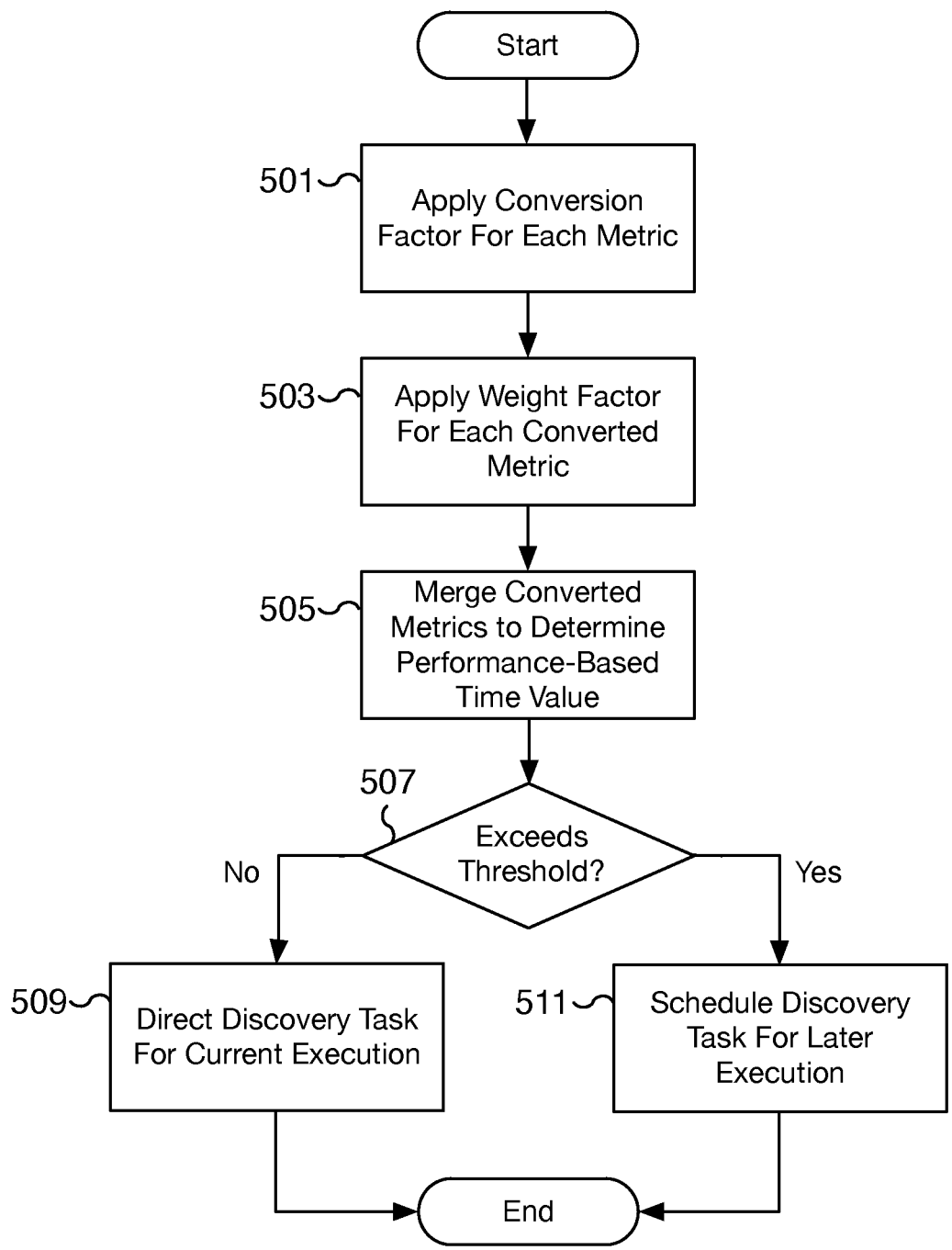
FIG. 5 is a flow chart illustrating an embodiment of a process for adaptively scheduling a discovery task.

FIG. 5 is a flow chart illustrating an embodiment of a process for adaptively scheduling a discovery task. For example, using the process of FIG. 5, a discovery task can be evaluated and directed for execution based on determined scheduling parameters. For example, a discovery task can be directed for immediate execution or for delayed execution using a delay parameter adapted to current conditions. In some embodiments, the process of FIG. 5 is performed at 205 of FIG. 2, at 303, 305, and/or 307 of FIG. 3, and/or 403, 405, and/or 407 of FIG. 4. In some embodiments, the process of FIG. 5 is performed by a discovery service such as discovery service 101 of FIG. 1 using a scheduling delay value determined from resource metrics associated with the discovery process such as resource metrics gathered from computing devices associated with discovery service 101 of FIG. 1, database 103 of FIG. 1, and one or more computing devices of customer network environment 111 of FIG. 1.

At 501, a conversion factor is applied to each resource metric. For example, for each resource metric, a configured conversion factor is applied to convert the resource metric to a time-based performance value. For example, a memory usage or server load percentage is converted to a time-based performance value in milliseconds. In some embodiments, the time-based performance value corresponds to the partial performance delay associated with the discovery process due to the measured metric.

At 503, a weight factor is applied to each converted metric. For example, for each resource metric, a configured weight factor is applied to weigh the metric differently from other resource metrics. For example, a database load percentage may be weighted more heavily than available storage. As another example, the time of day can be weighted more heavily than other factors allowing the time of day to take priority over other metrics. In various embodiments, the configured weights are applied to the resource metrics after they have been converted at 501 to a time-based performance value and the weighted resource metrics are weighted time-based performance values.

At 505, converted metrics are merged to determine a performance-based time value. In various embodiments, a performance-based time value corresponds to an error value associated with the utilization or amount of overload experienced by a computing device or resource. For example, the merged performance-based time value corresponds to the total expected delay associated with a pending discovery task. In various embodiments, each of the converted resource metrics are merged using their weighted time-based values. In some embodiments, the converted weighted resource metric values are summed together to determine a cumulative performance-based time value and/or the converted weighted resource metric values are merged into a list of performance-based time values that includes a time value for each resource metric. In some embodiments, one or more minimum and/or maximum clamp values can be applied. For example, the determined time-based performance values and/or the cumulative determined time-based performance value can be clamped to configure minimum and/or maximum values.

At 507, a determination is made whether the performance-based time value exceeds a configured threshold value. In the event the performance-based time value does not exceed the configured threshold value, processing proceeds to 509. In the event the performance-based time value exceeds the configured threshold value, processing proceeds to 511. In some embodiments, the determination using the configured threshold value is made by comparing the current time to a determined scheduled time that includes a potential scheduling delay. For example, in the event the scheduled time is before and/or matches the current time, processing proceeds to 509, and in the event the scheduled time is later than the current time, processing proceeds to 511 where the discovery is delayed.

At 509, the discovery task is directed for current execution. For example, the discovery task is directed for immediate execution based on the performance-based time value determined at 505 not exceeding a configured threshold value. In various embodiments, the discovery task is executed immediately when the expected performance delay is within the allowable configured threshold. For example, the current resource usage of existing tasks including discovery tasks and the expected resource utilization of the pending discovery task are within the allowable resource usage limits.

At 511, the discovery task is scheduled for later execution. For example, the discovery task is delayed based on the performance-based time value determined at 505 exceeding a configured threshold value. Instead of being executed immediately, the discovery task is scheduled for execution at a later time. In various embodiments, the scheduled time for execution is adaptive and scheduled based on resource utilization. For example, the scheduled time for execution can be based on a future time (or time window) for which the expected resource utilization will support executing the discovery task. In various embodiments, the scheduled time is a scheduling parameter determined by evaluating past, current, and expected performance values and can utilize proportional, integral, and differential factors as well as an increasing decay factor.

Figure 6:
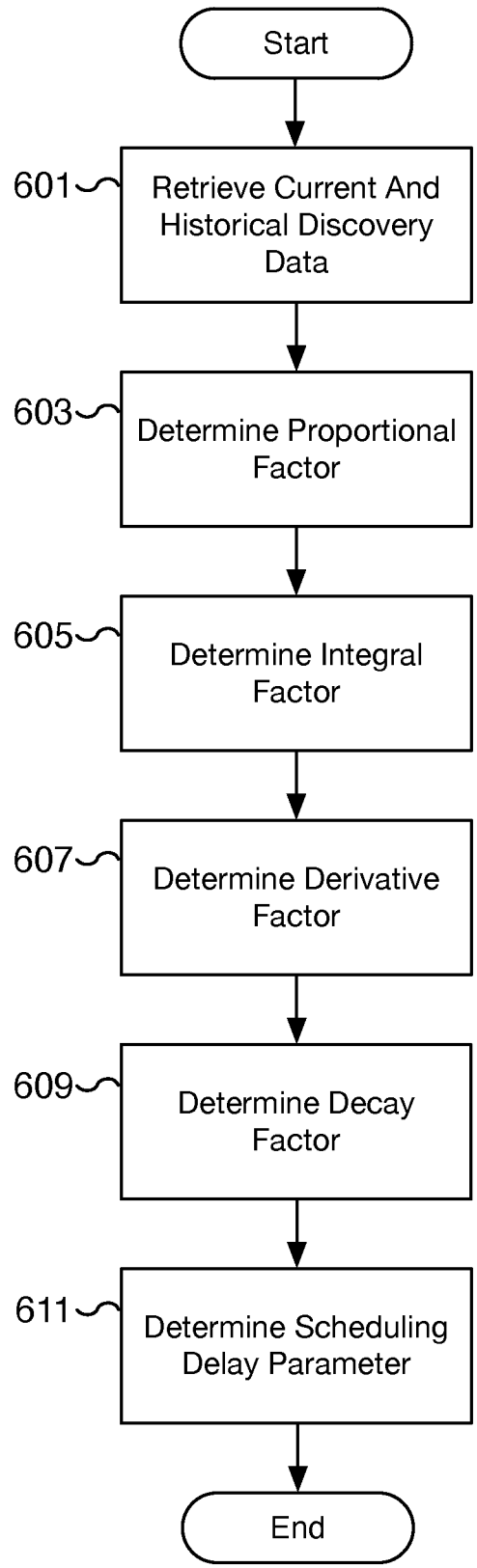
FIG. 6 is a flow chart illustrating an embodiment of a process for adaptively scheduling a discovery task.

FIG. 6 is a flow chart illustrating an embodiment of a process for adaptively scheduling a discovery task. For example, using the process of FIG. 6, a scheduling delay can be determined and used to delay the execution of a discovery task. In various embodiments, the delay is based on multiple factors including a proportional factor, an integral factor, and a derivative factor. Moreover, an increasing delay factor can be incorporated in the adaptive scheduling to prevent a discovery task from being repeatedly rescheduled with no opportunity to be executed. In some embodiments, the process of FIG. 6 is performed at 205 of FIG. 2, at 307 of FIG. 3, at 405 of FIG. 4, and/or at 511 of FIG. 5. In some embodiments, the process of FIG. 6 is performed by a discovery service such as discovery service 101 of FIG. 1 using data such as metrics, performance values, and/or scheduling parameters associated with the discovery process.

At 601, current and historical discovery data is retrieved. For example, metrics, performance values, and/or scheduling parameters from the current discovery task and from processing past discovery tasks are retrieved. In some embodiments, the retrieved data includes determined performance-based time values including error values, determined delay values, the metrics utilized, the weights applied to the metrics, and/or configured throttle or desired values, among other potential data. In various embodiments, a current determined performance-based time value reflects the current expected state of the discovery process and past determined performance-based time values reflect the past state of the discovery process. In some embodiments, the retrieved data includes error data such as performance-based error values determined by comparing past determined performance-based time values to desired performance or throttle time values. In some embodiments, the data is retrieved via the discovery service and may be stored in a data store such as a discovery database. In some embodiments, the database is database 103 of FIG. 1.

At 603, a proportional factor is determined. For example, a proportional factor is determined based on the current performance-based time value compared to a configured desired (or throttle) value. In some embodiments, the desired value is determined for each resource metric and the performance-based time value is compared to each configured desired value of each resource metric. Alternatively, in some embodiments, an overall performance-based time value is compared to a configured system desired value. In various embodiments, the performance-based time value corresponds to an error value associated with the utilization or amount of overload experienced by a computing device.

At 605, an integral factor is determined. For example, an integral factor is determined using past values such as past performance-based time values compared to their corresponding configured desired values. In some embodiments, the integral factor is determined using an average historical error such as the average error over the last five minutes. In various embodiments, the historical values are retrieved at 601 and are used to address historical errors. In some embodiments, the period of integration is configurable, for example, by configuring the time period for integration as a number of seconds.

At 607, a derivative factor is determined. For example, a derivative factor is determined to account for the differential error or the rate of change in the error. In some embodiments, the derivative factor is determined using the ratio between the most recent determined values and the previous determined values. For example, the proportional factor determined at 603 can be compared to the previously determined proportional factor to approximate a rate of change.

At 609, a decay factor is determined. For example, a decay factor is determined that decays the amount of time to delay the discovery task. In various embodiments, the decay factor is an increasing decay value that prevents the discovery task from being repeatedly rescheduled such that the task will never execute. By increasing the decay value after each rescheduling, the scheduled delay time will decrease over time and a pending discovery task will eventually be executed.

At 611, a scheduling delay parameter is determined. For example, using the factors determined at 603, 605, 607, and 609, a scheduling delay parameter is determined. In various embodiments, a configurable weight can be applied to each factor such as a weight applied to the proportional factor, the integral factor, and the derivative factor. The weighted factors can be summed to determine a scheduling delay parameter. In some embodiments, a multiplier is applied to summed weighted factors to determine a scheduling delay parameter with a configurable multiplier. In various embodiments, once an ideal scheduling delay parameter is determined using the proportional, integral, and derivative factors, a decay value is applied to prevent the task from being infinitely rescheduled. The decay value will ensure that a discovery task will be executed. Using the disclosed techniques, the determined scheduling delay parameter corresponds to a time or time window for performing the pending discovery task where the required discovery resources will be available and for which the impact of performing the task will be manageable. In some embodiments, the proportional, integral, and derivative factors are utilized to adaptively dampen swings when throttling discovery.

Figure 7:
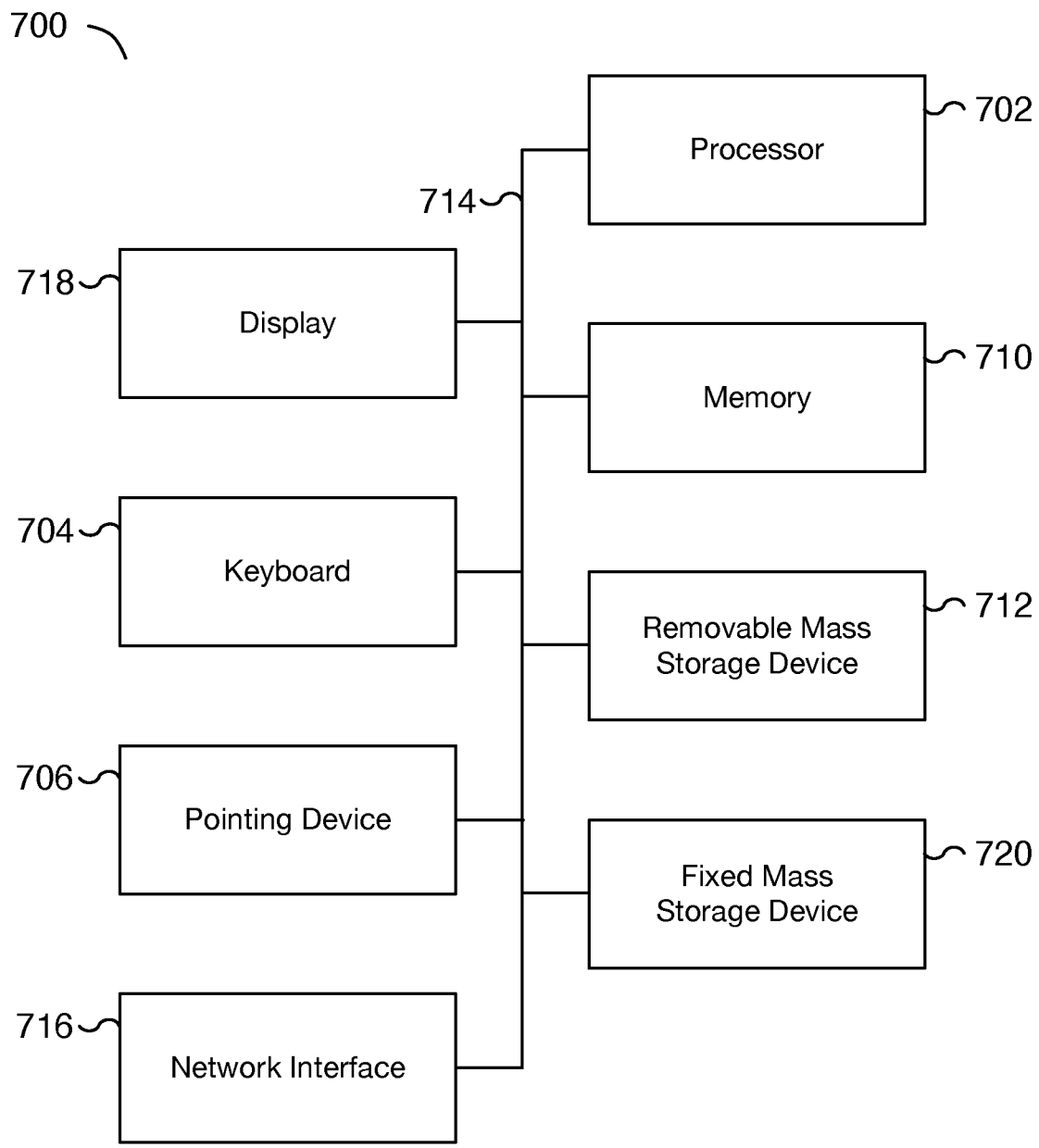
FIG. 7 is a functional diagram illustrating a programmed computer system for performing discovery within a customer network.

FIG. 7 is a functional diagram illustrating a programmed computer system for performing discovery within a customer network. As will be apparent, other computer system architectures and configurations can be utilized for performing discovery including the adaptive scheduling of discovery tasks. Examples of computer system 700 include one or more computers of discovery service 101 of FIG. 1, one or more computers of database 103 of FIG. 1, and/or one or more computers (or devices) of customer network environment 111 of FIG. 1 including internal server 107 of FIG. 1. Computer system 700, which includes various subsystems as described below, includes at least one microprocessor subsystem (also referred to as a processor or a central processing unit (CPU)) 702. For example, processor 702 can be implemented by a single-chip processor or by multiple processors. In some embodiments, processor 702 is a general purpose digital processor that controls the operation of the computer system 700. Using instructions retrieved from memory 710, the processor 702 controls the reception and manipulation of input data, and the output and display of data on output devices (e.g., display 718). In various embodiments, one or more instances of computer system 700 can be used to implement at least portions of the processes of FIGS. 2-6.

Processor 702 is coupled bi-directionally with memory 710, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 702. Also as is well known in the art, primary storage typically includes basic operating instructions, program code, data and objects used by the processor 702 to perform its functions (e.g., programmed instructions). For example, memory 710 can include any suitable computer-readable storage media, described below, depending on whether, for example, data access needs to be bi-directional or unidirectional. For example, processor 702 can also directly and very rapidly retrieve and store frequently needed data in a cache memory (not shown).

A removable mass storage device 712 provides additional data storage capacity for the computer system 700, and is coupled either bi-directionally (read/write) or unidirectionally (read only) to processor 702. For example, storage 712 can also include computer-readable media such as magnetic tape, flash memory, PC-CARDS, portable mass storage devices, holographic storage devices, and other storage devices. A fixed mass storage 720 can also, for example, provide additional data storage capacity. The most common example of mass storage 720 is a hard disk drive. Mass storages 712, 720 generally store additional programming instructions, data, and the like that typically are not in active use by the processor 702. It will be appreciated that the information retained within mass storages 712 and 720 can be incorporated, if needed, in standard fashion as part of memory 710 (e.g., RAM) as virtual memory.

In addition to providing processor 702 access to storage subsystems, bus 714 can also be used to provide access to other subsystems and devices. As shown, these can include a display monitor 718, a network interface 716, a keyboard 704, and a pointing device 706, as well as an auxiliary input/output device interface, a sound card, speakers, and other subsystems as needed. For example, the pointing device 706 can be a mouse, stylus, track ball, or tablet, and is useful for interacting with a graphical user interface.

The network interface 716 allows processor 702 to be coupled to another computer, computer network, or telecommunications network using a network connection as shown. For example, through the network interface 716, the processor 702 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 702 can be used to connect the computer system 700 to an external network and transfer data according to standard protocols. For example, various process embodiments disclosed herein can be executed on processor 702, or can be performed across a network such as the Internet, intranet networks, or local area networks, in conjunction with a remote processor that shares a portion of the processing. Additional mass storage devices (not shown) can also be connected to processor 702 through network interface 716.

An auxiliary I/O device interface (not shown) can be used in conjunction with computer system 700. The auxiliary I/O device interface can include general and customized interfaces that allow the processor 702 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 7 is but an example of a computer system suitable for use with the various embodiments disclosed herein. Other computer systems suitable for such use can include additional or fewer subsystems. In addition, bus 714 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving metrics that characterize one or more computing devices;
   determining a time value associated with a performance of the one or more computing devices based on the received metrics;
   determining a first scheduling parameter based on the time value, wherein the first scheduling parameter is associated with a first discovery process that is associated with at least a portion of the one or more computing devices; and
   directing execution of the first discovery process according to the first scheduling parameter.

2. The method of claim 1, wherein the first scheduling parameter indicates a delay value associated with the first discovery process, and wherein directing the execution of the first discovery process according to the first scheduling parameter includes delaying the first discovery process based on the delay value.

3. The method of claim 2, wherein the delay value is based on a proportional factor, an integral factor, and a derivative factor.

4. The method of claim 2, wherein the delay value is associated with an increasing decay factor.

5. The method of claim 1, wherein the first discovery process is configured to identify one or more configuration items of a configuration management database.

6. The method of claim 1, wherein the one or more computing devices include a configuration management database.

7. The method of claim 1, wherein determining the time value associated with the performance of the one or more computing devices based on the received metrics includes applying one or more conversion factors to at least a portion of the received metrics.

8. The method of claim 7, wherein at least one of the received metrics is received in a non-time-based unit.

9. The method of claim 7, wherein at least one of the received metrics includes a memory usage measure, a number of running discovery processes, a time of day, a log aggregation value, a database load measure, or a replication lag value.

10. The method of claim 1, further comprising reducing a resource utilization of at least one of the one or more computing devices.

11. The method of claim 1, further comprising reducing a resource utilization of a configuration management database.

12. The method of claim 1, further comprising determining a second scheduling parameter for a second discovery process, wherein the second scheduling parameter is different from the first scheduling parameter.

13. A system comprising:
one or more processors; and
a memory coupled to the one or more processors, wherein the memory is configured to provide the one or more processors with instructions which when executed cause the one or more processors to:
receive metrics that characterize one or more computing devices;
determine a time value associated with a performance of the one or more computing devices based on the received metrics;
determine a first scheduling parameter based on the time value, wherein the first scheduling parameter is associated with a first discovery process that is associated with at least a portion of the one or more computing devices; and
direct execution of the first discovery process according to the first scheduling parameter.

14. The system of claim 13, wherein the first scheduling parameter indicates a delay value associated with the first discovery process, and wherein directing the execution of the first discovery process according to the first scheduling parameter includes delaying the first discovery process based on the delay value.

15. The system of claim 14, wherein the delay value is based on a proportional factor, an integral factor, and a derivative factor.

16. The system of claim 14, wherein the delay value is associated with an increasing decay factor.

17. The system of claim 13, wherein determining the time value associated with the performance of the one or more computing devices based on the received metrics includes applying one or more conversion factors to at least a portion of the received metrics.

18. The system of claim 17, wherein at least one of the received metrics is received in a non-time-based unit.

19. The system of claim 17, wherein at least one of the received metrics includes a memory usage measure, a number of running discovery processes, a time of day, a log aggregation value, a database load measure, or a replication lag value.

20. A computer program product, the computer program product being embodied in a non-transitory computer readable storage medium and comprising computer instructions for:
receiving metrics that characterize one or more computing devices;
determining a time value associated with a performance of the one or more computing devices based on the received metrics;
determining a first scheduling parameter based on the time value, wherein the first scheduling parameter is associated with a first discovery process that is associated with at least a portion of the one or more computing devices; and
directing execution of the first discovery process according to the first scheduling parameter.

* * * * *